2,972,108
Patented Feb. 14, 1961

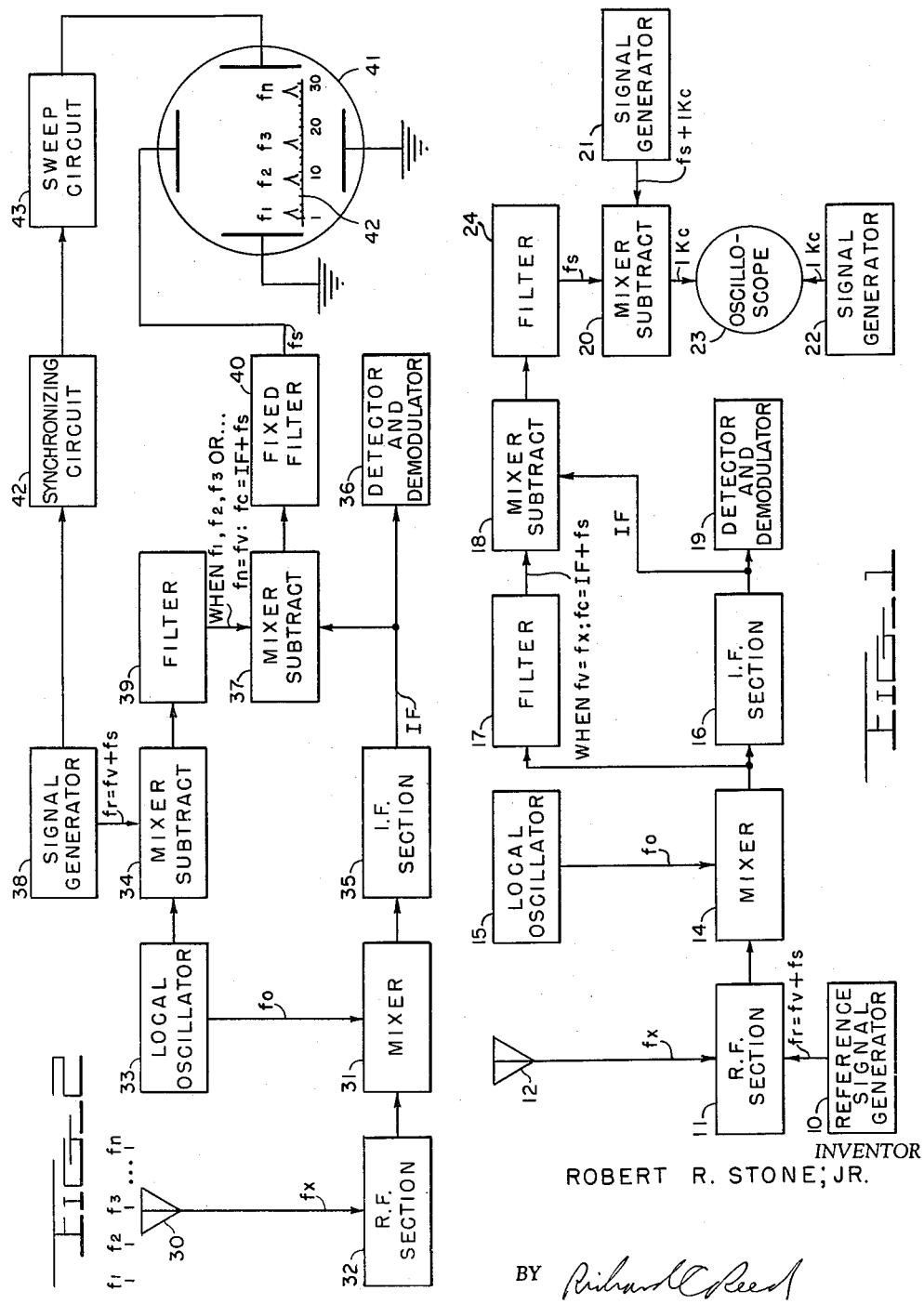

2,972,108

FREQUENCY MEASURING SYSTEM EMPLOYING FREQUENCY COMPARISON

Robert R. Stone, Jr., Rosecroft Park, Md., assignor to the United States of America as represented by the Secretary of the Navy Filed Mar. 17, 1959, Ser. No. 800,061

7 Claims. (Cl. 324—79)

(Granted under Title 35, U.S. Code (1952), sec. 266)

The invention described herein may be manufactured and used by or for the Government of the United States of America for governmental purposes without the payment of any royalties thereon or therefor.

This invention relates in general to a frequency measuring system and in particular to one employing frequency comparison.

In the field of electronic communications, it is often desired to measure the frequency of a received signal. There are devices in the prior art that accomplish this end by heterodyning the received signal with a source of standard signals and measuring the resulting beat frequency. These devices, however, have the disadvantage of destroying the intelligence conveyed by the received signal.

Accordingly, it is an object of the present invention to provide a frequency measuring system that will determine the frequency of a signal without interfering with the intelligence of the signal.

Another object of the present invention is to provide a frequency measuring system that will present each signal in a band of frequencies in a panoramic display without destroying the intelligence of the signals.

Other objects and advantages of the invention will become apparent from the following description of the annexed drawings, wherein:

Fig. 1 discloses a first embodiment of the present invention.

Fig. 2 discloses a second embodiment of the present invention.

In accordance with the teachings of the present disclosure, a receiver having a conventional IF section is employed to receive a signal. The received signal, or one dependent upon the same, is heterodyned in a first mixer with a reference frequency that may be varied in a range above a predetermined frequency. A signal in the output of the first mixer, having a frequency greater than the IF signal of the receiver, is fed through a filter to a second mixer where it is heterodyned with the IF signal. At the same time, the latter signal may be applied through a separate channel to a conventional detection system where the intelligence of the received signal may be recovered. When the frequency difference between the reference and predetermined frequency equals that of the received signal, the output frequency of the second mixer has the same value as the predetermined frequency. Thus, to measure the frequency without destroying the intelligence of the received signal, the reference frequency is varied until the output frequency of the second mixer and the predetermined frequency are equal, for at this point, the frequency of the received signal is equal to the difference between the predetermined and reference frequencies. In summary, the received signal is measured by comparing it with the difference between the predetermined and reference frequencies.

Referring to Fig. 1, reference signal generator 10 provides a signal $f_r$ equal to $f_v + f_s$, where $f_v$ is a frequency that may be varied in a selected spectrum and $f_s$ is a predetermined frequency. Signal $f_v$ may be varied manually or automatically over the frequency spectrum by well known techniques. Received signal $f_x$ and reference signal $f_r$ are applied through RF section 11 from antenna 12 and signal generator 10, respectively, and heterodyned with $f_o$, the output signal of local oscillator 15, to obtain a signal that is fed in parallel to IF section 16 and filter 17. Filter 17 applies signal $f_c$ to mixer 18, which signal is equal to $IF + f_s$ when $f_v = f_x$; and IF section 16 provides signal IF that is applied in parallel to mixer 18 and detector and demodulator 19. In mixer 18, signals IF and $IF + f_s$ are subtracted to derive a signal equal to $f_s$. The latter signal is fed through filter 24 to mixer 20 where it is subtracted from a signal equal to $f_s + 1$ kc. provided by signal generator 21 to obtain a 1 kc. signal. The 1 kc. signal provided by mixer 20 is fed to and compared with the 1 kc. signal generated by signal generator 22 on oscilloscope 23. It is, of course, understood that mixer 20, signal generators 21 and 22 and oscilloscope 23 comprise a preferred arrangement for determining the frequency output of filter 19 and that a variety of other well known frequency measuring or comparing devices could be used.

In a typical operation of the arrangement shown in Fig. 1, when the frequency of a received signal $f_x$ is to be measured, the output $f_r$ of signal generator 10 is varied until a one to one relationship is observed between the signals applied to oscilloscope 23. The output of filter 24 is then equal to $f_s$ and $f_x$, the received signal, is equal to $f_r - f_s$ or $f_v$. As the frequency is being measured, the IF signal may be fed to detector and demodulator 19 where the intelligence on the signal may be recovered.

Referring to Fig. 2, signal $f_x$, which may consist of any or all frequencies $f_1, f_2, f_3 \ldots f_n$ in a selected band, is received by antenna 30 and applied to mixer 31 through RF section 32. The output signal $f_o$ of local oscillator 33 is applied in parallel to mixers 31 and 34. In mixer 31, signals $f_o$ and $f_x$ are heterodyned to provide an output signal that is fed to IF section 35, thus obtaining signal IF. The latter signal is applied in parallel to detector and demodulator 36 and mixer 37. In detector and demodulator 36, the intelligence of signal IF may be recovered. Signal generator 38 provides a signal having a frequency that is varied over or scans the abovementioned selected band. In mixer 34, the output signal $f_o$ of local oscillator 33 is heterodyned with $f_r$, the signal provided by signal generator 38, to obtain a signal that is fed through filter 39 to mixer 37. Since $f_x = f_v$, when $f_v = f_1$, $f_2, f_3 \ldots$ or $f_n$ the output signal $f_c$ of filter 39 is equal to $IF + f_s$, which in mixer 37 is subtracted from IF to obtain a signal equal to $f_s$. The signal $f_s$ is fed through fixed filter 40 to the vertical plates of oscilloscope 41. Synchronizing circuit 42, connected between signal generator 38 and sweep circuit 43, synchronizes the output of the signal generator with the horizontal sweep of oscilloscope 41. The face of the oscilloscope 41 is provided with a scale 42 which may be calibrated for use in any selected frequency spectrum. It is understood that synchronizing circuit 42, sweep circuit 43 and oscilloscope 41 comprise a preferred type of panoramic display and that any number of conventional panoramic displays could be used in the arrangement disclosed in Fig. 2.

In a typical operation of the embodiment shown in Fig. 2, when a signal $f_x$ comprising signals $f_1, f_2, f_3 \ldots f_n$ is received, as signal generator 38 scans the selected spectrum, the relationship between $f_r$ and $f_1, f_2, f_3 \ldots f_n$ will be such that during successive time intervals $f_v$ will equal a respective one of the frequencies $f_1, f_2, f_3 \ldots$ or $f_n$. During each of these time intervals, the output of filter 39 will be $IF + f_s$ and the output signal $f_s$ of fixed filter 40 will be applied to the vertical plates of oscilloscope 41 causing a pip to appear on the face of the oscilloscope. The pips, representing signals $f_1, f_2, f_3 \ldots f_n$, may be identified by reference to the calibration of scale 42, while simultaneously, the intelligence of the received signals may be recovered from the IF signal in detector and demodulator 36.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention. It is therefore to be understood that within the scope of the appended claims the invention may be practiced otherwise than as specifically described.

What is claimed is:

1. In a frequency measuring system, means for receiving a signal having a frequency within a predetermined band of frequencies, signal generating means for providing a reference frequency, a local oscillator, mixing means connected to said first mentioned means, said signal generating means, and said local oscillator for heterodyning the received signal, the output of said local oscillator, and said reference signal, a first channel, a second channel, means for applying the output of said mixing means to said first channel and said second channel, and means connected to said first channel and said second channel for comparing the frequency of the output signal of said first channel with the frequency of the output signal of said second channel.

2. In a frequency measuring system, means for receiving a signal having a frequency within a predetermined band of frequencies, signal generating means for providing a reference signal having a frequency substantially equal to the sum of a variable frequency and a predetermined frequency, a local oscillator, first mixing means connected to said first mentioned means, said signal generating means, and said local oscillator for heterodyning the received signal, the output of said local oscillator and said reference signal, first channel means for providing a first signal having a selected intermediary frequency, second channel means for providing a second signal having a frequency substantially equal to the sum of said intermediary frequency and the predetermined frequency of said reference signal, means for applying the output of said first mixing means to said first channel means and said second channel means, second mixing means connected to said first channel means and said second channel means for subtracting the frequency of said first signal from the frequency of said second signal, an output circuit, and means for connecting said output circuit to said second mixing means.

3. In a frequency measuring system, means for receiving a signal having a frequency within a predetermined band of frequencies, signal generating means for providing a reference signal having a frequency substantially equal to the sum of a variable frequency and a predetermined frequency, a local oscillator, first mixing means connected to said first mentioned means, said signal generating means, and said local oscillator for heterodyning the received signal, the output of said local oscillator and the reference signal, first channel means for providing a first signal having a selected intermediary frequency, second channel means for providing a second signal having a frequency substantially equal to the sum of said intermediary frequency and the predetermined frequency of said reference signal, means for applying the output of said first mixing means to said first channel means and said second channel means, second mixing means connected to said first channel means and said second channel means for subtracting the frequency of said first signal from the frequency of said second signal, and means connected to said second mixing means for indicating the presence in the output thereof of a signal having a frequency equal to the predetermined frequency of said reference signal.

4. In a frequency measuring system, means for receiving a signal having a frequency within a predetermined band of frequencies, signal generating means for providing a reference signal having a frequency substantially equal to the sum of a variable frequency and a predetermined frequency, a local oscillator, first mixing means connected to said first mentioned means, said signal generating means, and said local oscillator for heterodyning the received signal, the output of said local oscillator and the reference signal, first channel means for providing a first signal having a selected intermediary frequency, second channel means for providing a second signal having a frequency substantially equal to the sum of said intermediary frequency and the predetermined frequency of said reference signal, means for applying the output of said first mixing means to said first channel means and said second channel means, second mixing means connected to said first channel means and said second channel means for providing a signal having a frequency equal to said predetermined frequency by subtracting the frequency of said first signal from the frequency of said second signal, and means connected to said second mixing means for measuring the frequency of the output signal of the second mixing means.

5. A frequency measuring system as set forth in claim 4 wherein the last mentioned means comprises a second signal generating means for providing a second reference signal having a frequency that differs from the predetermined frequency by a selected value, means connected between said second mixing means and said second signal generating means for subtracting the frequency of said predetermined frequency from that of the second reference signal thereby providing a difference signal, an oscilloscope having vertical plates and horizontal plates, means for applying said difference signal to said vertical plates, means for generating a comparison signal having a frequency substantially equal to that of said difference signal, and means for applying said comparison signal to said horizontal plates.

6. In a frequency measuring system, means for receiving a signal having a frequency within a predetermined band of frequencies, an oscillator for providing a local signal, a first mixer, means for applying the received signal and said local signal to said first mixer, a signal generator for providing a reference signal having a frequency equal to a predetermined frequency and a selected frequency, a second mixer, means for applying said local signal and said reference signal to said second mixer, a first channel for providing a first signal having an intermediary frequency, a detector and demodulator, means for connecting said detector and demodulator to said first channel, a second channel for providing a second signal having a frequency equal to the sum of said first signal and the predetermined frequency of said reference signal, means for connecting said first and second channels to said first and second mixers, respectively, a third mixer for subtracting the frequency of said first signal from that of said second signal to provide a difference signal, means for connecting said third mixer to said first and second channels, an oscilloscope having vertical and horizontal plates, means for applying said difference signal to said vertical plates, a sweep circuit, means for connecting said sweep circuit to said horizontal plates, a synchronizing circuit, and means for connecting said synchronizing circuit between said signal generator and said sweep circuit.

7. In a frequency measuring system, means for receiving a frequency within a predetermined band of frequencies, a local oscillator for providing a local signal, a first mixer, means for applying the received frequency and said local signal to said first mixer, a signal generator for providing a reference signal having a frequency equal to a predetermined frequency and a selected frequency, a second mixer, means for applying said local signal and said reference signal to said second mixer, a first channel for providing a first signal having an intermediary frequency, a detector and demodulator connected to said first channel, a second channel for providing a second signal having a frequency equal to the sum of said first signal and the predetermined frequency of said reference signal, means for connecting said first and second channels to said first and second mixers, respectively, a third mixer connected to said first and second channels, and means connected to said third mixer for measuring the frequency of the output signal thereof.

References Cited in the file of this patent

UNITED STATES PATENTS

| | | |
|---|---|---|
| 2,498,919 | Heller | Feb. 28, 1950 |
| 2,630,528 | Kamphoefner | Mar. 3, 1953 |
| 2,642,534 | Robinson et al. | June 16, 1953 |
| 2,817,835 | Worthington | Dec. 24, 1957 |

FOREIGN PATENTS

| | | |
|---|---|---|
| 628,312 | Great Britain | Aug. 25, 1949 |